UNITED STATES PATENT OFFICE.

ARTHUR HAUSDÖRFER, OF ELBERFELD, AND CARL HEIDENREICH, OF LEVERKUSEN, GERMANY, ASSIGNORS TO FARBENFABRIKEN VORM. FRIEDR. BAYER & CO., OF ELBERFELD, GERMANY, A CORPORATION OF GERMANY.

AZO TRIPHENYLMETHANE DYE.

980,251.     Specification of Letters Patent.     Patented Jan. 3, 1911.

No Drawing.     Application filed May 24, 1910. Serial No. 563,045.

*To all whom it may concern:*

Be it known that we, ARTHUR HAUSDÖRFER and CARL HEIDENREICH, doctors of philosophy, chemists, citizens of the German Empire, residing, respectively, at Elberfeld and Leverkusen, Germany, have invented new and useful Improvements in Azo Triphenylmethane Dyes, of which the following is a specification.

Our invention relates to the manufacture and production of new azotriphenylmethane dyestuffs which can be chromed after dyeing. The process for their production consists in condensing aminobenzaldehydes with two molecules of an aromatic oxycarboxylic acid, diazotizing the resulting leuco compounds, combining the diazo compounds with azodyestuff components and oxidizing the leucoazo dyestuffs, or oxidizing the leuco compounds before or after the diazotation and combining them with azo dyestuff components.

The new dyestuffs are in the shape of the free carboxylic acids after being dried and pulverized red to black powders which are soluble in caustic soda lye with a reddish to violet color and which are soluble in concentrated sulfuric acid generally with a reddish color; yielding upon treatment with stannous chlorid and hydrochloric acid a dyestuff of the triphenylmethane series derived from an aminobenzaldehyde and an aromatic oxycarboxylic acid and an amino compound. The dyes thus obtained dye wool from acid baths from yellow to red shades; green to dark violet to black shades fast to potting being obtained on chroming.

In order to illustrate the new process more fully the following example is given, the parts being by weight:—45 parts of the leuco compound obtained from 1 molecule of ortho-chloro-meta-aminobenzaldehyde and 2 molecules of ortho-cresotinic acid are stirred up with 400 parts of water, 14 parts of calcined sodium carbonate are added to obtain a solution and the leuco compound is precipitated again by adding a mixture of 63 parts of hydrochloric acid 19° Bé. and 300 parts of ice. It is then diazotized by means of a solution of 6.9 parts of sodium nitrate in water at a temperature of 5–10° C. The diazo compound thus obtained is introduced into a well cooled solution of 15.5 parts of ortho-cresotinic acid in 500 parts of water and 27 parts of calcined sodium carbonate, 40 parts of a 30 per cent. caustic soda lye are added while the solution is stirred until the combination is complete. It is then warmed to 60° C., the dye is precipitated with hydrochloric acid, filtered off, washed and dried. It is a yellow product scarcely soluble in water and in dilute acids, easily soluble in dilute alkalies with a yellow color.

To produce the coloring matter the leuco compound is dried and 60 parts of it are dissolved in 300 parts of concentrated sulfuric acid and to this solution while being stirred 7 parts of sodium nitrite in 100 parts of concentrated sulfuric acid are added. The mixture is then warmed to 50 to 60° C. until the quantity of the color does no longer increase. The dark red melt is poured on ice, the precipitate is filtered off and dried. The new dye is a red powder scarcely soluble in water and soluble in dilute alkalies with a yellowish-brown coloration. It dyes wool from acid baths yellow-brown shades which on being treated with bichromate change into a full yellowish-green fast to fulling, potting and light. Upon treatment with stannous chlorid and hydrochloric acid it is split up, the dyestuff of the triphenylmethane series derived from meta-amino-ortho-chloro-benzaldehyde (dyeing wool blue after chroming) and ortho-cresotinic acid and para-amino-cresotinic acid are obtained. Other aldehydes may be used, such as ortho-chloro-para-aminobenzaldehyde, meta-aminobenzaldehyde-ortho-sulfonic acid, para-aminobenzaldehyde-ortho-sulfonic acid and other azo dyestuff components, such as alpha-naphthol, beta-naphthol, alpha-oxynaphthoic acid, beta-oxynaphthoic acid, 1-phenyl-3-methyl-5-pyrazolone, alpha-methylindol, 2-phenylamino-5-naphthol-7-sulfonic acid, etc.

We claim:—

1. The herein described new dyestuffs obtainable by reacting with the diazo compounds of the triphenylmethane leuco compounds derived from an aminobenzaldehyde and an aromatic oxycarboxylic acid upon an azo dyestuff component and oxidizing the leuco compounds, which dyestuffs are in the shape of the free carboxylic acids, after being dried and pulverized red to black powders which are soluble in caustic soda lye with a reddish to violet color and which are soluble in concentrated sulfuric acid with a reddish color; yielding upon treatment with stannous chlorid and hydrochloric acid a dyestuff of the triphenylmethane series derived from an aminobenzaldehyde and an aromatic oxy-carboxylic acid and an amino compound; dyeing wool from acid baths yellow to red shades, green to dark violet to black shades fast to potting being obtained on chroming, substantially as described.

2. The herein described new dyestuff obtainable by reacting with the diazo compound of the triphenylmethane leuco compound derived from ortho-chloro-meta-amino-benzaldehyde and ortho-cresotinic acid upon ortho-cresotinic acid and oxidizing the leuco compound, which dyestuff is in the shape of the free carboxylic acid after being dried and pulverized a red powder scarcely soluble in water and soluble in dilute alkalies with a yellowish-brown coloration; yielding upon treatment with stannous chlorid and hydrochloric acid the dyestuff of the triphenylmethane series derived from meta-amino-ortho-chloro-benzaldehyde and ortho-cresotinic acid and para-amino-cresotinic acid; dyeing wool from acid baths yellow-brown shades which on being treated with bichromate change into a full yellowish-green fast to fulling, potting and light, substantially as described.

In testimony whereof we have hereunto set our hands in the presence of two subscribing witnesses.

ARTHUR HAUSDÖRFER. [L. S.]
CARL HEIDENREICH.

Witnesses:
 OTTO KÖNIG,
 CHAS. J. WRIGHT.